No. 775,492. PATENTED NOV. 22, 1904.
A. R. KARREMAN & O. DEL GUERRA.
PNEUMATIC TIRE FOR VEHICLE WHEELS.
APPLICATION FILED APR. 27, 1904.
NO MODEL.

Witnesses
Carl F. Schafer
J. H. Birmingham

Inventors
A. Reginald Karreman
Oreste Del Guerra
By John L. Kindt, Atty.

No. 775,492. Patented November 22, 1904.

UNITED STATES PATENT OFFICE.

ADRIAN REGINALD KARREMAN AND ORESTE DEL GUERRA, OF CHICAGO, ILLINOIS.

PNEUMATIC TIRE FOR VEHICLE-WHEELS.

SPECIFICATION forming part of Letters Patent No. 775,492, dated November 22, 1904.

Application filed April 27, 1904. Serial No. 205,268. (No model.)

*To all whom it may concern:*

Be it known that we, ADRIAN REGINALD KARREMAN, a citizen of the United States of America, and ORESTE DEL GUERRA, a subject of the King of England, both residents of Chicago, in the county of Cook and State of Illinois, have invented certain new and useful Improvments in Pneumatic Tires for Bicycles, Automobiles, and the Like, of which the following is a specification, reference being had to the accompanying drawings.

Our invention relates to the construction of pnuematic tires for use on bicycles, automobiles, and vehicles of like character, the primary object being to construct a tire that shall be practically puncture-proof and at the same time one that will retain its resiliency and shape.

In constructing our improved tire we have not relied wholly upon the usual method of assembling successive layers of rubber and fabric, because ordinarily tires constructed in accordance with this method possess a very small degree of resiliency, and consequently cause inconvenience to the rider; but to accomplish the object hereinbefore stated we have embedded within the body portion of the tire a series of metallic strips so positioned as to form a metallic wall between the outer and inner surfaces of the tread of the tire, the result being that there is no unprotected spot upon the tread of the tire through which a nail or any other sharp piece of metal or glass and the like can pierce without having its progress stopped by one of the said strips.

With the above and various other objects in view, which will be plainly evident as the description proceeds, the invention consists in the novel construction and arrangement of parts, which will now be more fully described and claimed, reference being had to the accompanying drawings, forming a part of this specification, in which—

Figure 1:
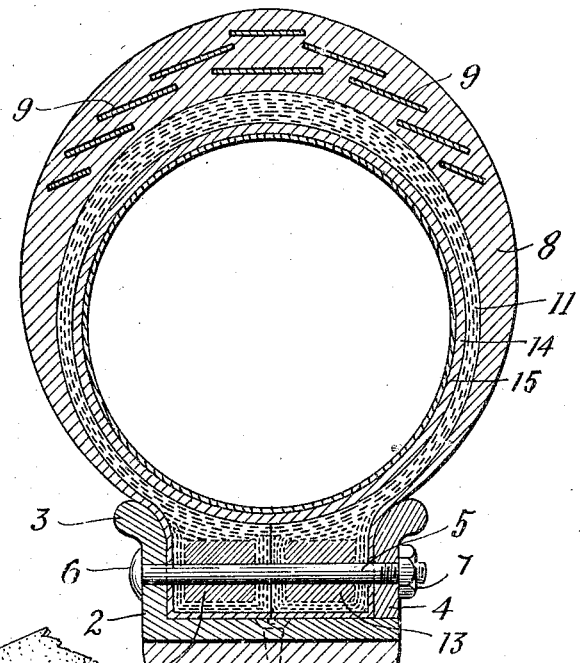
Figure 3:
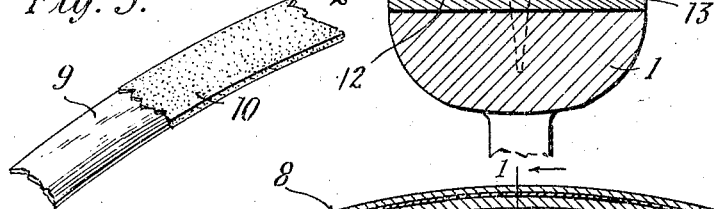
Figure 2:
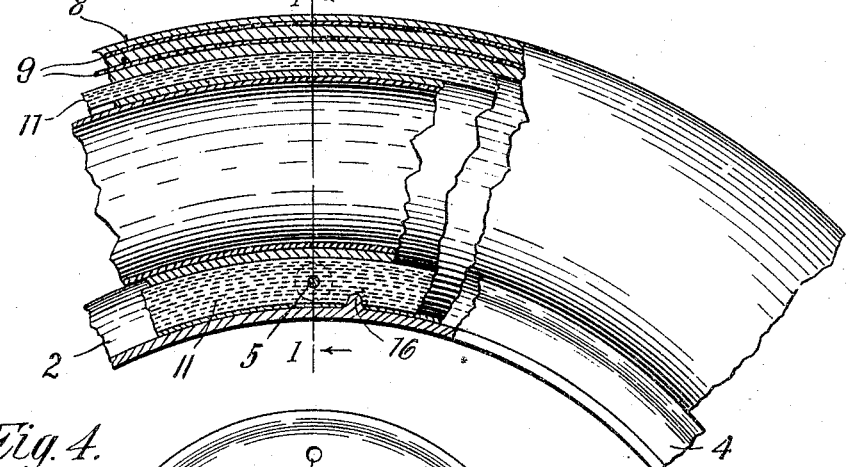
Figure 4:
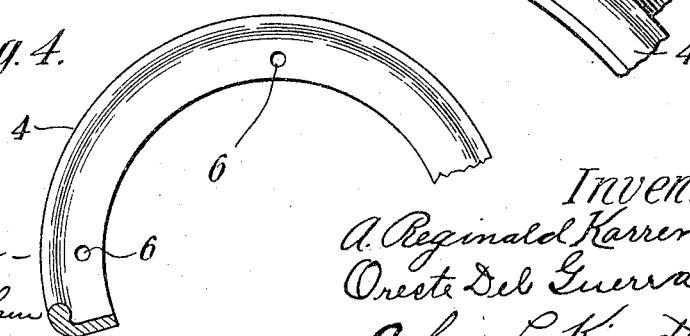

Figure 1 is an enlarged transverse section on the line 1 1 of Fig. 2, showing an advantageous arrangement of the protecting metallic strips. Fig. 2 is a side elevation, partly in section, showing the tire in position for use mounted upon a suitable base. Fig. 3 is a detailed view of a portion of one of the protecting metallic strips, showing the same incased in a covering of textile fabric; and Fig. 4 is a side elevation, partly broken away, of one of the plates forming a portion of the seat for the tire.

The pneumatic tire contemplated in this invention is designed to be mounted upon a rim having a perfectly-smooth periphery, such rim being designated by the numeral 1. An L-shaped plate 2, having its longer leg of the same width as the rim 1 and secured thereto by screws or any other suitable means and having its shorter leg curved outwardly, as at 3, to correspond to the curvature of the tire, forms one member of the tire-securing medium, the other member (designated by the numeral 4) being of the same contour as the shorter leg of the plate 2. This plate 4 is mounted upon the longer leg of the plate 2 and has its outwardly-curved edge in the same plane as the edge 3 of the plate 2. Thus the plates 2 and 4 form a seat for the tire of which the shorter leg of the plate 2 and the plate 4 form side walls and the longer leg of the plate 2 the base. Bolts 5, passing through corresponding apertures 6 in the plates 2 and 4, serve to connect the latter and also to securely fasten between the said plates the successive layers of rubber and fabric forming the base portion of the tire, as will be hereinafter described in detail. These bolts 5 have their ends threaded to receive nuts 7, arranged on the outer surface of the plate 4 and bearing against the same, so that as the said nuts are turned in either direction the plate 4 can be moved in the corresponding direction. Thus adjustment of the width of the space between the walls, or, as I shall term it, the "seat" is provided.

The outer casing 8 of the tire has its tread portion made much thicker than its base, and within the tread portion are embedded the circumferential plates 9, which are preferably incased in a covering 10 of textile fabric, (shown in detail in Fig. 3,) although this is not an essential feature of our invention. The metallic strips 9 are preferably arranged in a stepped relation, as shown, one above the other until midway the tread, and then one below the other, the edges of the said strips overlapping, so as to form a solid wall or barrier between the outer and inner surfaces of the tire, and thereby rendering the same impenetrable. We have shown the metallic strips 9 arranged in a spaced-apart stepped relation in the drawings, but do not limit ourselves to that arrangement, as any arrangement that would form a barrier between the outer and inner surfaces of the tread of the tire would serve just as well—such, for instance, as a staggered arrangement of the strips. The casing 8 decreases in thickness from the tread portion to the base, and that portion of the casing within the seat is made as thin as possible without endangering the life or wearing quality of the tire. On the inner surface of the casing 8 and connected thereto by cement in the usual manner are strips of fabric 11, the strips being greatest in number beneath the tread of the tire and decreasing in number as the thickness of the casing 8 decreases from the tread to the base. These strips of fabric meet at a point midway the seat and are then turned downwardly toward the base. At the base and at a point central thereof they are divided, half of the strips being turned toward one wall and half toward the other wall of the seat, from thence being turned upwardly and extending parallel with the walls until they meet and are joined to those strips within the body of the tire adjacent the seat. By this arrangement two annular chambers approximately rectangular in cross-sction are formed, within which are placed the strengthening-braces 12 and 13, preferably of metal. 14 and 15 represent inflatable tubes of soft rubber arranged within the casing formed by the strips of fabric 11, the number of such tubes being immaterial and depending upon the class of vehicles or roadways in connection with which the tire is used.

The bolts 5 in addition to connecting the walls of the seat for the tire serve to secure the tire and the braces 12 and 13 within the said seat, thereby performing a double function. As an additional means for securing the tire within the seat we have formed transverse ribs 16 at intervals along the leg of the plate 2 on the base member of the seat, these ribs extending through the successive layers of rubber and canvas on the base of the seat and interlocking therewith.

By having the metallic protecting wall or barrier made in spaced-apart overlapping strips and not in a single plate of metal we insure a maximum degree of flexibility and resiliency to the tire, at the same time completely protecting the same from punctures. Furthermore, the metallic strips can be made very light and thin and at the same time perform their function just as thoroughly as a comparatively thick sheet of metal, without having any of the disadvantages of the latter. The sole function of the fabric is to brace or strengthen the outer casing 8 and not to obviate the danger from punctures, as has heretofore been the case when fabric has been used in tires of this class. For this reason we have arranged the fabric within the outer casing 8, but not embedded in the same, as in the usual construction. We are aware that it is old to use metal in the construction of tires, and we do not claim the same broadly; but What we do claim and desire to secure by Letters Patent is—

1. In a pneumatic tire, a rim, a seat secured thereto and having side walls, and means for binding said walls against a tire, combined with a rubber tire having a thickened tread, a plurality of layers of fabric within said tire and having their edges folded within the seat to form two annular chambers of substantially rectangular cross-section, and strengthening-braces fitting in said chambers, and through which braces the binding means of the tire is passed, substantially as described.

2. In a pneumatic tire, a rim, a seat embodying an integral base and side wall, and an oppositely-disposed separate side wall, a flexible tube having a thickened tread and a thinner portion, the latter engaging the seat, a plurality of layers of fabric within the tube, said layers of fabric being brought together and then folded within the seat, annular braces within the seat and around which the folded portions of the fabric layers are wrapped, and bolts passing through the side walls, and through the fabric, and binding the tube within the seat, substantially as described.

3. A pneumatic tire comprising an outer casing, circumferentially-arranged metallic strips within the outer casing, disposed in ascending and descending relation with the successive edges overlapping, combined with a seat having a movable side wall and within which seat the outer casing is received, layers of fabric within the outer casing, annular braces within the seat, and around which the fabric is wrapped, and bolts passing through the side walls and braces and binding the outer casing between said side walls, substantially as described.

In testimony whereof we have hereunto signed our names to this specification in the presence of two subscribing witnesses.

A. REGINALD KARREMAN.
ORESTE DEL GUERRA.

Witnesses:
CHARLES S. HAMILTON,
R. ELMER HAMILTON.